UNITED STATES PATENT OFFICE.

JOHN J. BURCHENAL, OF CINCINNATI, OHIO, ASSIGNOR TO THE PROCTER AND GAMBLE COMPANY, OF CINCINNATI, OHIO, A CORPORATION OF OHIO.

FOOD PRODUCT.

1,135,935.  Specification of Letters Patent. Patented Apr. 13, 1915.

No Drawing.  Application filed November 10, 1910. Serial No. 591,727.

*To all whom it may concern:*

Be it known that I, JOHN J. BURCHENAL, a citizen of the United States, and a resident of the city of Cincinnati, in the county of Hamilton and State of Ohio, have invented certain new and useful Improvements in Food Products, of which the following is a specification.

This invention is a food compound closely simulating lard in its physical and chemical characteristics, consisting of a mixture of an oil and a hardening agent produced by hydrogenizing an oil or liquid fat.

In its preferred form, the new product is a vegetable one, consisting of a mixture of about 85 per cent. of cotton-seed oil and 15 per cent. of hydrogenized cotton-seed oil. In the manufacture of this product, cotton-seed oil, oleic acid, or other suitable body containing unsaturated fatty acids or their glycerids or esters, is hydrogenized, or caused to chemically absorbe hydrogen. This reaction is preferably effected by vigorously agitating the cotton-seed oil or other raw material in a closed vessel containing an atmosphere of compressed hydrogen, a catalytic agent, such as kieselguhr impregnated with finely-divided nickel, being maintained in suspension in the oil and the charge being heated to a temperature of about 155° C. The oil is thereby converted into a white or yellowish solid, containing additional hydrogen about 5 to 6 per cent. more than in the nonhydrogenized material, having a saponification value of about 190, an iodin value of about 20, a melting point of about 56° C., and a titer of about 55° C., giving no reaction for cotton-seed oil under the Halphen test. Suitable proportions of the hydrogenized and hardened oil and of the non-hydrogenized oil are now thoroughly mixed or blended. In case about 15 per cent. of hydrogenized cottonseed oil and 85 per cent. of non-hydrogenized cottonseed oil are thus mixed, the final product is a white or yellowish semi-solid, having a sponification value of about 195; an iodin value of about 95; a melting-point of about 42° C.; and a titer of about 36° C.

The invention is not restricted to hydrogenizing the oil which is used for hardening to the particular degree above specified, nor to its use in the particular proportions mentioned. In case a harder hydrogenized stock is used, it will be understood that its proportion may be correspondingly reduced. For example, if the oil used for hardening is hydrogenized to an iodin value of 8 or 9, approximately 10 per cent. of the hardened material will be required to yield a mixture having physical constants approximately as above specified.

I claim:

1. A lard-like composition comprising edible hydrogenized fatty oil.

2. A lard-like composition comprising edible hydrogenized vegetable oil.

3. An edible oil product comprising hydrogenized cottonseed oil and edible oily material blending therewith.

4. An edible oil product of lard-like consistency, comprising edible hydrogenized oil and edible oily material blending therewith.

5. An edible fatty product of substantially lard-like consistency, comprising edible hydrogenized-oil material and edible fatty material blending therewith.

6. An edible fatty product, comprising edible hydrogenized oil material and edible fatty material blending therewith.

7. A food-product comprising an intimate mixture of hydrogenized vegetable oil and non-hydrogenized vegetable oil.

8. A food-product comprising an intimate mixture of a vegetable oil and a hydrogenized portion of the same variety of the vegetable oil.

9. A food-product comprising an intimate mixture of hydrogenized cottonseed oil and non-hydrogenized cottonseed oil.

10. A food-product simulating lard in its physical and chemical characteristics and comprising an intimate mixture of hydrogenized vegetable oil and non-hydrogenized vegetable oil.

11. A food-product simulating lard in its physical and chemical characteristics and comprising an intimate mixture of a vegetable oil and a hydrogenized portion of the same variety of the vegetable oil.

12. A food-product simulating lard in its physical and chemical characteristics and comprising an intimate mixture of hydrogenized cottonseed oil and non-hydrogenized cottonseed oil.

13. A food product, consisting of a mixture of a liquid oil or fat and a solid hydrogenized oil or fat, being a semi-solid body having, approximately, a saponification value of 195, an iodin value of 95, a melting point of 42° C., and a titer of 36° C.

14. A food product, consisting of a mixture of about 85 per cent. of cotton-seed oil and 15 per cent. of hydrogenized cotton-seed oil, being a white or yellowish semi-solid having, approximately, a saponification value of 195, an iodin value of 95, a melting point of 42° C., and a titer of 36° C.

JOHN J. BURCHENAL.

Attest:
A. G. FRENCH,
R. B. MEAD.